A. N. EATON.
STOCK WATERING DEVICE.
APPLICATION FILED NOV. 22, 1916.
1,220,404.
Patented Mar. 27, 1917.
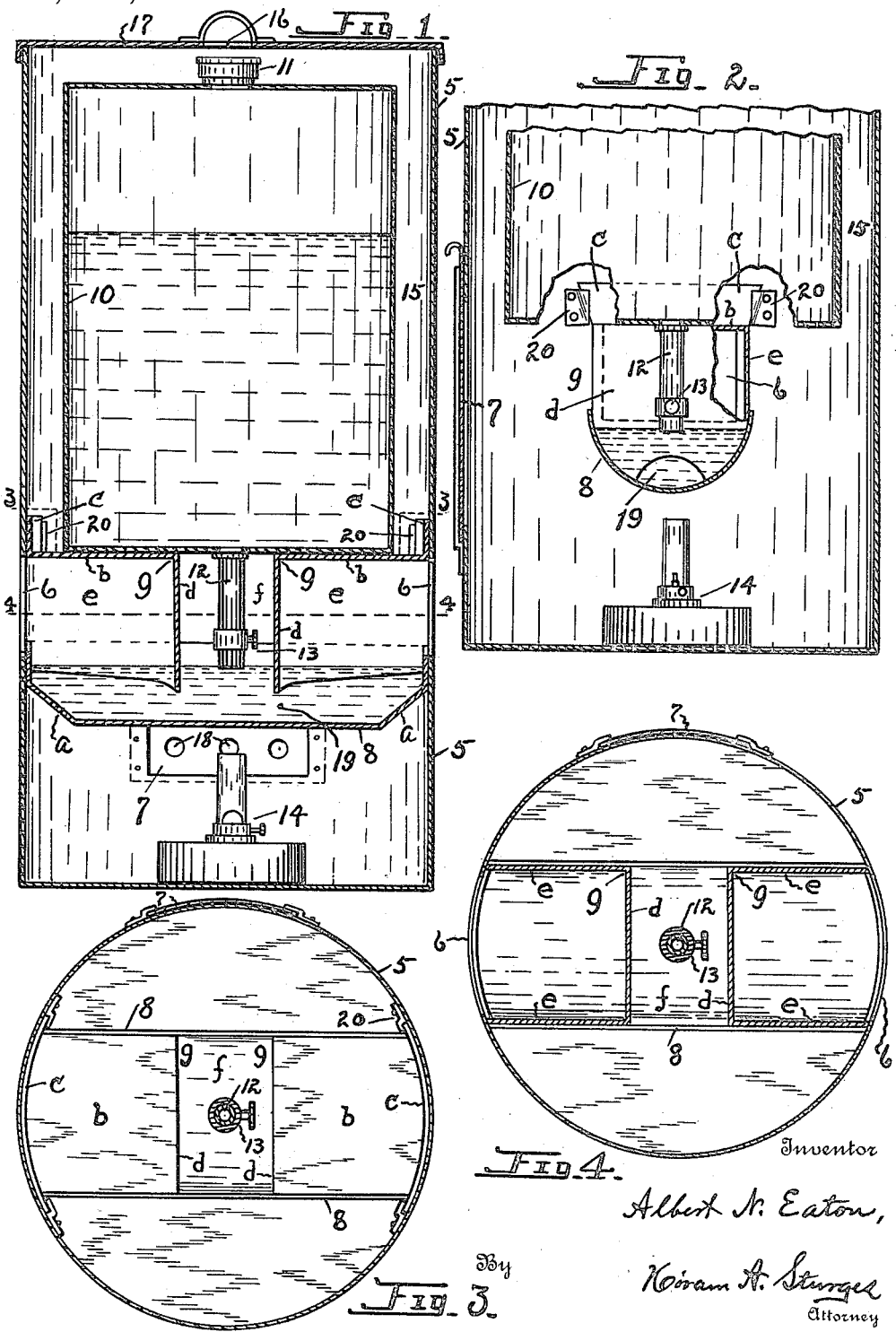

UNITED STATES PATENT OFFICE.

ALBERT N. EATON, OF OMAHA, NEBRASKA.

STOCK-WATERING DEVICE.

1,220,404.   Specification of Letters Patent.   Patented Mar. 27, 1917.

Application filed November 22, 1916. Serial No. 132,786.

*To all whom it may concern:*

Be it known that I, ALBERT N. EATON, a citizen of the United States, residing at Omaha, in the county of Douglas and State of Nebraska, have invented certain new and useful Improvements in Stock-Watering Devices, of which the following is a specification.

This invention relates to a hog-watering device for use in freezing weather, and has for its object to provide a watering trough which will be accessible at all times to stock, will be automatically supplied with water from a container protected from freezing, the parts to be economical in manufacture, convenient in use, and arranged for adequately sustaining all stresses incident to its use.

The invention consists of the novel construction, combination and arrangement of parts as described herein and claimed, and as illustrated in the accompanying drawing, wherein,—

Figure 1 is a view in longitudinal section through the casing, water barrel and trough. Fig. 2 is a broken away longitudinal section of the device, taken at right angles to the view shown in Fig. 1. Fig. 3 is a transverse section on line 3 3 of Fig. 1. Fig. 4 is a transverse section on line 4 4 of Fig. 1.

Referring now to the drawing for a more particular description, numeral 5 indicates a cylindrical casing of sheet metal, open at its top and closed at its bottom, said casing being provided, near its bottom, in its opposed sides with drink-openings 6, and provided with a slide door 7 equidistant from said openings.

Extending between and disposed below the openings 6 is an elongated, transversely curved watering trough 8, its ends being suitably secured to the walls of the casing, its bottom preferably being curved longitudinally and upwardly near its ends as indicated at *a*, so that the trough may be conveniently cleaned.

Disposed above and in the plane of the trough are two opposed hoods 9, each having a flat top *b* and provided with a vertical flange *c* suitably secured to the wall of the casing, the inner, vertical end wall *d* of the hood having parts engaging the bottom of the trough and having opposed sides *e* extending from the horizontal top of the hood to terminate below the side edges of the trough.

The hoods thus described may each be constructed of a metallic sheet bent to form the parts mentioned, each hood having a length less than one-half of the diameter of the casing so that their end walls *d* will be disposed adjacent to each other to provide a recess *f* therebetween.

An air-tight barrel 10 is employed for containing water and is supported by the hoods, its upper end being provided with a screw-cap 11, and its lower end, at its middle, being provided with a discharge pipe 12, the length of said pipe 12 being such that when the barrel is seated upon the hoods, the lower end of the pipe will be disposed below the side edges of the trough and above the lower edges of the imperforate sides of the hoods.

Since the barrel is air-tight, it is obvious that when the valve 13 is opened, water from the barrel will partly fill the trough, the level of the water being approximately in line with the lower end of the pipe, and when a quantity of water is thereafter removed from the trough, a like quantity will pass from the barrel to the trough, to maintain a uniform supply therein.

A lamp 14 is disposed below the trough for heating the water sufficiently to prevent freezing, heat being imparted to the water in the barrel since it has a diameter sufficiently less than the diameter of the casing to provide an annular chamber or passageway 15 therebetween, for a movement of heated air, an opening 16 in the lid 17 of the casing permitting the warm air or a part thereof to pass therethrough; and draft apertures 18 are provided for the slide door 7.

The portable, hog-watering device thus described, on account of the construction and arrangement of parts as described, has many advantages. It will be noted that no independent mounting is required for the water barrel since the opposed hoods provide an adequate support therefor; also that the recess *f* provides a required space below the barrel within which the discharge pipe 12 may be disposed, this recess being so arranged that the valve may be conveniently adjusted whenever required; also the end walls *d* of the hoods operate as barrierplates to prevent disarrangement of the valve when an animal is drinking. On account of the construction as described, the water will not be exposed to freezing except at the openings 6, below the hood, and only a limited degree of heat, comparatively, will be required, for it will be noted that the water in the trough will seal any intervening space between the trough and hood since the sides e project downward a greater distance than the pipe 12, and extend below the water level, to prevent cold air from entering.

At 19 is indicated a recess formed in the lowermost part of each end wall d of the hoods to permit water to circulate in the trough. By referring to Fig. 2 it will be seen that the hoods may be removably secured to the casing since the flanges c may be held by the clips or brackets 20 which are secured to the casing, thereby providing a firm mounting for the hoods since parts of their end walls d engage the bottom of the trough, the weight of the barrel operating to maintain the parts in stationary relation. While I do not limit myself to this removable mounting for the hoods, it is of advantage since the parts may be more conveniently assembled and the hoods may be readily removed and cleaning of the trough facilitated.

Having fully described my invention, what I claim and desire to secure by Letters Patent is—

1. In a stock watering device, a cylindrical casing provided with an apertured lid and having drink apertures formed in its opposed sides, an elongated trough disposed horizontally in the casing between the drink apertures, a pair of hoods disposed in the trough with a passageway between their inner ends each being provided with a flat top and having its sides and inner end projecting above the trough to provide a compartment opening on a drink aperture, a water container disposed within the casing upon the hoods and having a discharge pipe extending within said passageway to terminate between the sides and above the bottom of the trough, and a heating element within the casing.

2. In a stock watering device, a cylindrical casing provided with an apertured lid and having drink openings in its opposed sides, a trough arranged in the casing between the drink openings, a pair of hoods within the trough, each having its top, sides and inner end projecting above the sides of the trough, a water barrel closed at one of its ends, its opposite end being provided with a discharge pipe having a valve for controlling a flow therefrom, said barrel being disposed within the casing upon said hoods with its discharge pipe projecting downwardly intermediate the hoods to terminate between the sides and above the bottom of the trough, said casing being provided with a doorway and closure to permit manual control of the valve, and means for applying heat to the trough.

3. In a stock watering device, a cylindrical casing provided with an apertured lid and having drink apertures formed in its opposed sides, a trough arranged in the casing between the drink apertures, a pair of hoods disposed with their inner ends adjacent to each other within the trough, each being provided with a flat top and having its sides and inner end projecting above the trough to provide a compartment opening on a drink aperture, a water container provided with a discharge pipe, said water container being disposed within the casing upon the hoods with its discharge pipe extending between the hoods, the discharge terminal of said pipe being disposed within the trough in a plane above the lower edges of the sides of the hood, and a heating element within the casing.

4. In a stock watering device, a cylindrical casing provided with drink openings in its opposed sides, a trough arranged in the casing between the drink openings, a pair of hoods within the trough, each having its top, sides and inner end projecting above the sides of the trough, a water barrel closed at one of its ends, its opposite end being provided with a discharge pipe, said barrel being disposed within the casing upon said hoods with its discharge pipe projecting downwardly intermediate the hoods within the trough with its free end disposed in a plane above the lower edges of the sides of the hood, an apertured cover for the casing, and means for applying heat to the trough.

5. In a stock watering device, a cylindrical casing provided with an apertured lid and having drink openings formed in its opposed sides, a trough arranged horizontally in the casing between and having a part disposed below the drink openings, a pair of hoods within the trough, each having a flat top and having its inner end and sides overhanging the trough, a cylindrical water container supported by the hoods and disposed substantially midway between the side walls of the casing to provide an annular chamber therein, said container having a discharge pipe extending between the inner ends of the hoods to dispose its terminal within the trough in a plane above the lower edges of the sides of the hood, and means for applying heat to the trough.

6. In a stock watering device, a cylindrical casing having drink openings in its opposed sides and provided with brackets adjacent to said openings, a trough disposed transversely of the casing adjacent to the drink openings, a pair of hoods removably secured to said brackets and having their sides and inner ends disposed in said trough, a water container removably mounted on the hoods and having a discharge pipe projecting downwardly between the hoods with its free end disposed above the bottom of the trough, means within the casing for heating the trough, and an apertured lid for the casing.

7. In a stock watering device, a cylindrical casing provided with an apertured lid and having drink apertures in its sides, a trough in the casing between the drink apertures, a pair of hoods removably connected with the casing and seated in the trough to open upon the drink apertures, a water container provided with a discharge pipe, said container being adapted to be seated upon the hoods with its discharge pipe extending between the inner ends thereof, the free end of said pipe being disposed adjacent to the bottom of the trough, and a heating element within the casing.

In testimony whereof, I have affixed my signature in presence of two witnesses.

ALBERT N. EATON.

Witnesses:
HIRAM A. STURGES,
A. H. STURGES.

Copies of this patent may be obtained for five cents each, by addressing the "Commissioner of Patents, Washington, D. C."